(12) United States Patent
Masuda et al.

(10) Patent No.: US 10,848,324 B2
(45) Date of Patent: Nov. 24, 2020

(54) COMMUNICATION DEVICE, CERTIFICATE AUTHORITY DEVICE, AND RECORDING MEDIUM

(71) Applicant: Panasonic Intellectual Property Management Co., Ltd., Osaka (JP)

(72) Inventors: Yoichi Masuda, Osaka (JP); Tomoki Takazoe, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/500,604

(22) PCT Filed: Apr. 11, 2018

(86) PCT No.: PCT/JP2018/015218
§ 371 (c)(1),
(2) Date: Oct. 3, 2019

(87) PCT Pub. No.: WO2018/216384
PCT Pub. Date: Nov. 29, 2018

(65) Prior Publication Data
US 2020/0036536 A1    Jan. 30, 2020

(30) Foreign Application Priority Data
May 24, 2017  (JP) ................................. 2017-102749

(51) Int. Cl.
*H04L 9/32*    (2006.01)
(52) U.S. Cl.
CPC .................................. *H04L 9/3268* (2013.01)
(58) Field of Classification Search
CPC .................................................... H04L 9/3268
(Continued)

(56) References Cited

U.S. PATENT DOCUMENTS 5,666,416 A * 9/1997 Micali ..................... G06Q 20/02
380/286
7,882,129 B1 * 2/2011 Williams ................ G06F 16/48
707/780
(Continued)

FOREIGN PATENT DOCUMENTS

JP    2003-115838 A    4/2003
JP    2003-264538 A    9/2003
(Continued)

OTHER PUBLICATIONS

International Search Report issued in corresponding International Patent Application No. PCT/JP2018/015218, dated Jul. 17, 2018, with English Translation.
(Continued)

*Primary Examiner* — Jacob Lipman
(74) *Attorney, Agent, or Firm* — McDermott Will & Emery LLP (57) ABSTRACT

An HEMS controller receives a certificate revocation list distributed from a certificate authority server and listing serial numbers of revoked electronic certificates. The serial number of the electronic certificate includes a first identifying part that indicates a value for identifying a type of a participation node maintaining the electronic certificate and a second identifying part that indicates a value for identifying an individual participation node. In the case the certificate revocation list includes a serial number in which the second identifying part is a predetermined value, the HEMS controller determines that the electronic certificate of a participation node that meets the type indicated by the first identifying part of the serial number is invalid.

7 Claims, 8 Drawing Sheets

(58) Field of Classification Search
USPC .......................................................... 713/156
See application file for complete search history.

(56) References Cited

U.S. PATENT DOCUMENTS

| 10,010,031 | B1* | 7/2018 | Liu ......................... A01G 25/16 |
| 2009/0072978 | A1* | 3/2009 | Tilson, Jr. ........... B28B 23/0031 |
| | | | 340/572.9 |
| 2012/0057592 | A1* | 3/2012 | Zeppetelle ............. G01D 4/004 |
| | | | 370/390 |

FOREIGN PATENT DOCUMENTS

| JP | 2013-143762 A | 7/2013 |
| WO | 2015/092949 A1 | 6/2015 |
| WO | 2016/151987 A1 | 9/2016 |

OTHER PUBLICATIONS

Decision to Grant a Patent issued in corresponding Japan Patent Application No. 2017-102749, dated May 19, 2020, with English translation.

* cited by examiner

COMMUNICATION DEVICE, CERTIFICATE AUTHORITY DEVICE, AND RECORDING MEDIUM

CROSS REFERENCE TO RELATED APPLICATIONS

This application is the U.S. National Phase under 35 U.S.C. § 371 of International Application No. PCT/JP2018/015218, filed on Apr. 11, 2018, which claims the benefit of Japanese Application No. 2017-102749, filed on May 24, 2017, the entire contents of each are hereby incorporated by reference.

TECHNICAL FIELD

The present invention relates to data processing technology and, more particularly, to a communication device, a certificate authority device, and a computer program.

BACKGROUND ART

Electronic devices provided with a communication function (hereinafter, also referred to as "communication devices") extensively use an electronic certificate (i.e., a public key certificate) received from a communication partner device to verify the legitimacy of the partner device. An electronic certificate includes the serial number of the electronic certificate and the electronic signature of the certificate authority.

The certificate authority issues a certificate revocation list listing the serial numbers of the revoked electronic certificates. In the case the serial number of the electronic certificate of the partner device is listed in the certificate revocation list issued by the certificate authority, the communication device determines that the electronic certificate is invalid.

PATENT LITERATURE

[Patent Literature 1] JP2013-143762

SUMMARY OF INVENTION

Technical Problem

As the number of communication devices for which the electronic certificate is revoked increases, the number of serial numbers entered in the certificate revocation list increases, i.e., the data size of the certificate revocation list grows. A larger data size of the certificate revocation list may make it difficult to load the communication device with the certificate revocation list.

The disclosure addresses the above-described issue, and a general purpose thereof is to provide a technology of inhibiting the data size of a certificate revocation list from increasing even when the number of devices for which the electronic certificate is revoke increases.

Solution to Problem

A communication device according to an embodiment includes: a communication unit that receives a certificate revocation list distributed from a certificate authority and listing serial numbers of revoked electronic certificates; and a control unit. The serial number of the electronic certificate includes a first identifying part that indicates a value for identifying a type of a device maintaining the electronic certificate and a second identifying part that indicates a value for identifying the device maintaining the electronic certificate. In the case the certificate revocation list received by the communication unit includes a serial number in which the second identifying part is a predetermined value, the control unit determines that the electronic certificate of a device that meets the type indicated by the first identifying part of the serial number is invalid.

Another embodiment of the present disclosure relates to a certificate authority device. The device includes an issuing unit that issues a certificate revocation list listing listing serial numbers of revoked electronic certificates. The serial number of the electronic certificate includes a first identifying part that indicates a value for identifying a type of a device maintaining the electronic certificate and a second identifying part that indicates a value for identifying the device maintaining the electronic certificate. By setting a serial number including the first identifying part of a value indicating a particular type and the second identifying part of a predetermined value in the electronic certificate revocation list, the issuing unit revokes the electronic certificate of a device that meets the particular type.

Optional combinations of the aforementioned constituting elements, and implementations of the invention in the form of methods, computer programs, recording mediums encoded with computer programs, etc. may also be practiced as additional modes of the present invention.

Advantageous Effects of Invention

According to the disclosure, the data size of a certificate revocation list is inhibited from increasing even when the number of devices for which the electronic certificate is revoked increases.

DESCRIPTION OF EMBODIMENTS

The device, the system, or the entity that executes the method according to the disclosure is provided with a computer. By causing the computer to run a program, the function of the device, the system, or the entity that executes the method according to the disclosure is realized. The computer is comprised of a processor that operates in accordance with the program as a main hardware feature. The disclosure is non-limiting as to the type of the processor so long as the function is realized by running the program. The processor is comprised of one or a plurality of electronic circuits including a semiconductor integrated circuit (IC) or a large-scale integration (LSI). The plurality of electronic circuits may be integrated in one chip or provided in a plurality of chips. The plurality of chips may be aggregated in one device or provided in a plurality of devices. The program is recorded in a non-transitory recording medium such as a computer-readable ROM, optical disk, and hard disk drive. The program may be stored in a recording medium in advance or supplied to a recording medium via wide area communication network including the Internet.

A brief summary will be given before describing the configuration of the embodiment. It is envisaged that home energy management systems (HEMS) for managing energy used at home will be used popularly. We have developed a scheme for a communication device of a HEMS to verify whether the electronic certificate of a communication partner device participating in the HEMS is valid or not by referring to the certificate revocation list distributed from the server of the certificate authority. The certificate revocation list records serial numbers of revoked electronic certificates. Therefore, as the number of revoked electronic certificates increases, the data size of the certificate revocation list grows. A larger data size of the certificate revocation list has a disadvantage of making it difficult to load an HEMS communication device with the certificate revocation list.

A method is available that inquires the certificate authority server about the validity of the electronic certificate of the communication partner device based on the online certificate status protocol (OCSP), instead of verifying the validity of the electronic certificate of the communication partner device by using the certificate revocation list. However, the method results in an increase in the number of accesses to the certificate authority server as the number of communication partner devices increases. As a result, there is a disadvantage in that the cost of operating the certificate authority server increases as the number of communication partner devices increases. There is also a disadvantage in that, as the number of communication partner devices increases, the load on the certificate authority server increases and the response time of the server will be longer. Further, the device that accesses the certificate authority server needs to be connected to the network.

In this background, the technology of inhibiting the data size of a certificate revocation list from increasing even when the electronic certificates of a large number of devices are revoked will be described in this embodiment. In the first embodiment, the technology of collectively invalidating the electronic certificates of a plurality of devices belonging to the same device type (model No.) by designating a single serial number will be described. In the second embodiment, the technology of collectively invalidating the electronic certificates of a plurality of devices covering a plurality of device types manufactured by the same manufacturer by designating a single serial number will be described. It is assumed that one manufacturer manufactures devices covering a plurality of device types. Each device type includes a plurality of devices manufactured with the same product number. In other words, the relationship device⊆device type⊆manufacturer holds.

First Embodiment

Figure 1:
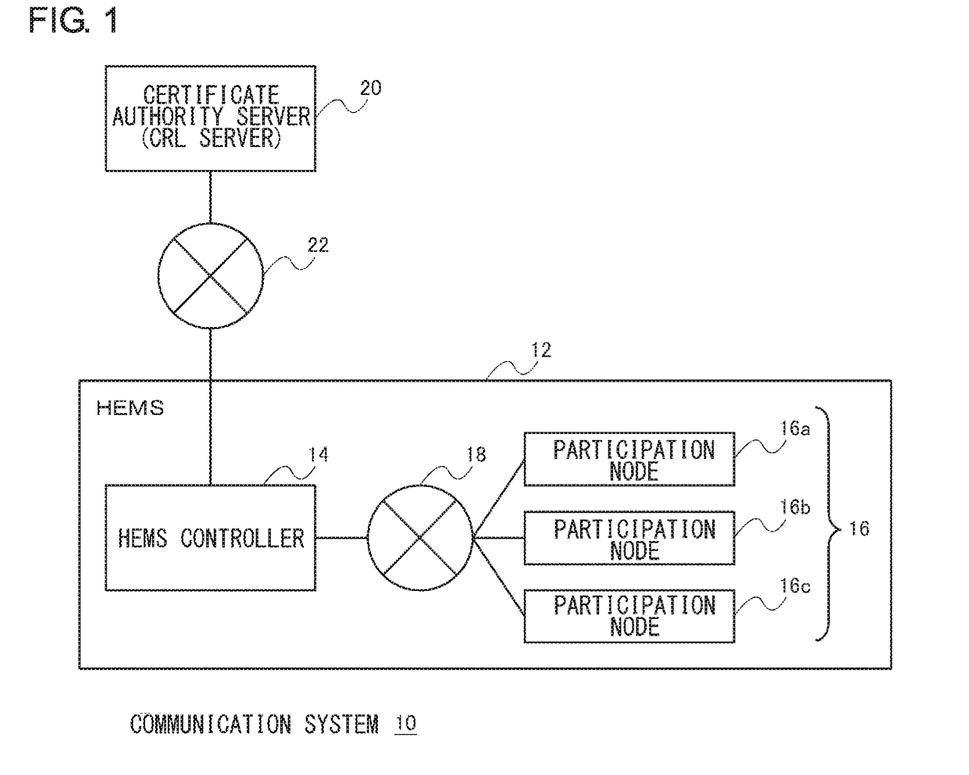
FIG. 1 shows a configuration of a communication system according to the first embodiment.

FIG. 1 shows a configuration of a communication system 10 according to the first embodiment. The communication system 10 includes an HEMS 12 built in the house of a user and a certification authority server 20. The HEMS 12 includes an HEMS controller 14, a participation node 16a, a participation node 16b, and a participation node 16c (generically referred to as "participation nodes 16").

Each of the plurality of participation nodes 16 may be an electronic device (e.g., a PC, a smartphone), an electric appliance (e.g., a home electric appliance such as an air conditioner, lighting, etc.), or an electric facility (e.g., a storage battery) participating in the HEMS 12. The HEMS controller 14 is an information processing device for managing the production, storage, purchase, consumption of the energy in the HEMS 12. The HEMS controller 14 and the participation node are communication devices each having a communication function and transmit and receive data via a home network 18.

The HEMS controller 14 is connected to the certificate authority server 20 via an external network 22 including LAN, WAN, Internet, etc. FIG. 1 shows one HEMS 12. In practice, a plurality of HEMS controllers 14 in a plurality of HEMSs 12 built in a plurality of houses are connected to the certificate authority server 20.

The certificate authority server 20 is an information processing device exhibiting the function of a certificate authority. The certificate authority server 20 is provided with the function of a CRL server for providing a certificate revocation list. The certificate authority server 20 is connected (not shown in FIG. 1) to the terminal of the manufacturer of the participation node 16 via the external network 22 to distribute the electronic certificate. The terminal of the manufacturer may be a PC of the factory that manufactures the participation node 16.

Figure 2:
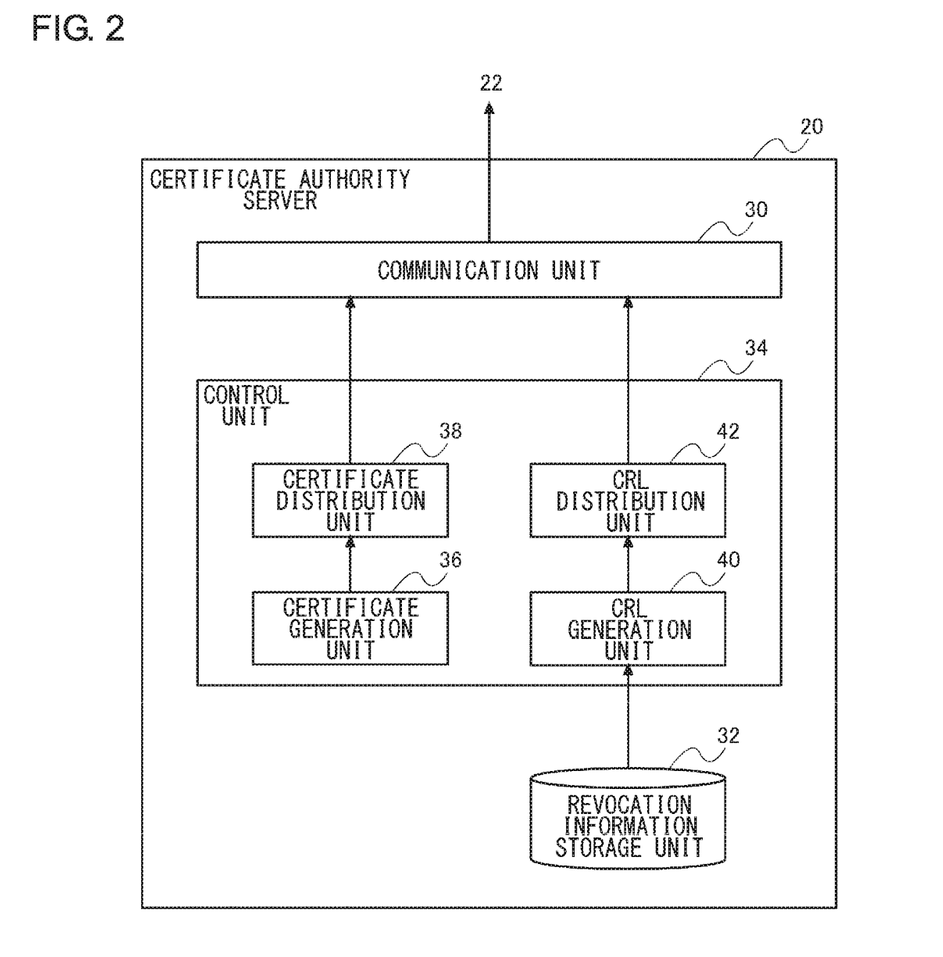
FIG. 2 is a block diagram showing functions and a configuration of the certificate authority server of FIG. 1.

FIG. 2 is a block diagram showing functions and a configuration of the certificate authority server 20 of FIG. 1. The certificate authority server 20 includes a communication unit 30, a revocation information storage unit 32, and a control unit 34. The blocks depicted in the block diagram of this specification are implemented in hardware such as elements or mechanical devices such as a CPU and a memory of a computer, and in software such as a computer program. FIG. 2 depicts functional blocks implemented by the cooperation of these elements. Therefore, it will be obvious to those skilled in the art that the functional blocks may be implemented in a variety of manners by a combination of hardware and software.

The communication unit 30 communicates with an external device in accordance with a predetermined protocol. More specifically, the communication unit 30 communicates with the HEMS controller 14 and the terminal of the manufacturer of the participation node 16 via the external network 22.

The revocation information storage unit 32 stores information related to revoked electronic certificates. More specifically, the revocation information storage unit 32 stores serial numbers of revoked electronic certificates that should be listed in the certificate revocation list. Further, the revocation information storage unit 32 stores a value indicating a particular device type that a plurality of devices belong to for which device type the electronic certificates of the plurality of devices should be revoked collectively (hereinafter, also referred to as "collective revocation device type").

The control unit 34 performs various data processes. The control unit 34 includes a certificate generation unit 36, a certificate distribution unit 38, a CRL generation unit 40, and a CRL distribution unit 42. The control unit 34 may further include other publicly known functions in a certificate authority.

The certificate generation unit 36 generates data for the electronic certificates of the respective devices participating in the HEMS 12. The electronic certificate of the embodiment includes a serial number showing a unique value for each electronic certificate. The electronic certificate may also include other items. For example, the electronic certificate may include a public key of the device loaded with the electronic certificate and may further include the electronic signature of the certificate authority. The certificate distribution unit 38 transmits the data for the electronic certificate generated by the certificate generation unit 36 to the terminal of the manufacturer of the participation node 16 via the communication unit 30.

The CRL generation unit 40 generates data for the certificate revocation list listing the serial numbers stored in the revocation information storage unit 32 every time an elapse of a predefined period of time is detected. The CRL distribution unit 42 transmits the data for the certificate revocation list generated by the CRL generation unit 40 to the HEMS controller 14 and the terminal of the manufacturer of the participation node 16 via the communication unit 30. The manufacturer of the participation node 16 stores, in the storage unit provided in the participation node 16, the data for the electronic certificate and the data for the certificate revocation list provided from the certificate authority server 20 to the terminal.

Figure 3A:
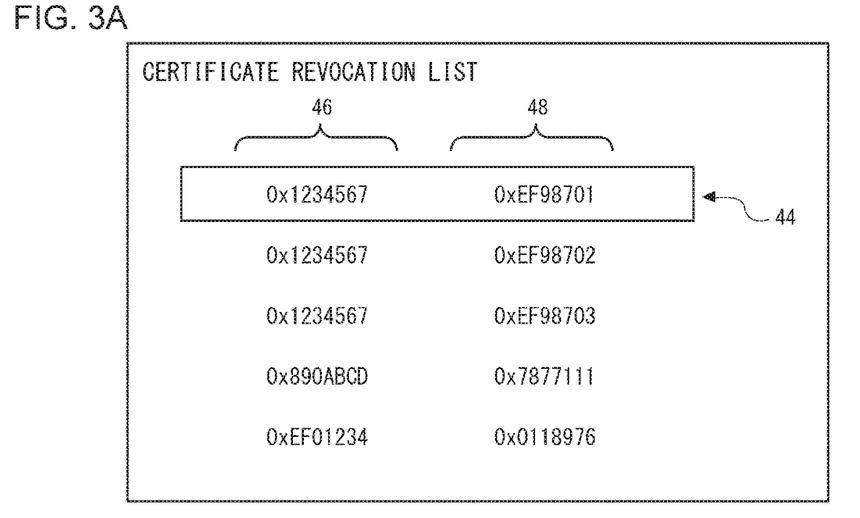
FIGS. 3A and 3B show examples of the certificate revocation list of the first embodiment.

FIG. 3A shows an example of the certificate revocation list of the first embodiment. The certificate revocation list includes a plurality of serial numbers 44 of a plurality of electronic certificates. The serial number 44 of the electronic certificate according to the first embodiment includes a device type identifying part 46 and a device identifying part 48. The device type identifying part 46 is a field in which a value for identifying a type of a device (i.e., device type) maintaining the electronic certificate is set. In the embodiment, the device type is defined for each number (i.e., model number) for each model of the device. In other words, a unique value is set in the device type identifying part 46 for each product number of the device. The device identifying part 48 is a field in which a value for identifying an individual device maintaining the electronic certificate is set. In other words, a value unique to each of the devices (e.g., product number) is set in the device identifying part 48 regardless of whether the device type differ or are identical.

The CRL generation unit 40 and the CRL distribution unit 42 of the embodiment function as an issuing unit that issues a certificate revocation list. The issuing unit sets, in the certificate revocation list, the serial number including the device type identifying part 46 of a value indicating a particular device type for which the electronic certificate should be revoked collectively, and the device identifying part of a predetermined value (hereinafter, "collective revocation value"). This allows the issuing unit to revoke the electronic certificates of a plurality of devices that meet the aforementioned particular device type. In the embodiment, the electronic certificates of all devices that meet the aforementioned particular device type are revoked.

Figure 3B:
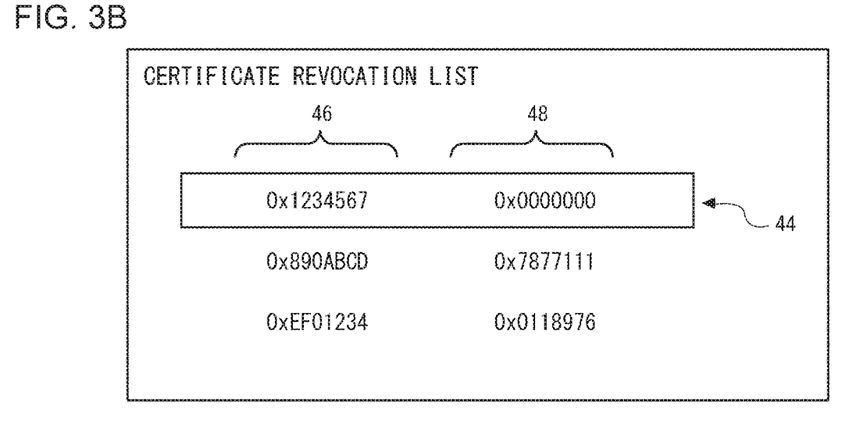

The collective revocation value in the first embodiment is assumed to be an all-0 bit series (i.e., 0x0000 . . . ). In one variation, the collective revocation value may be a value other than an all-0 bit series. It is preferred that it is a value that is not normally set in the device identifying part 48. The CRL generation unit 40 generates a serial number in which the value indicating the collective revocation device type stored in the revocation information storage unit 32 is set in the device type identifying part 46, and in which the collective revocation value is set in the device identifying part 48, and sets the serial number in the certificate revocation list. FIG. 3B shows an example of the certificate revocation list of the first embodiment. The serial number 44 in the figure shows that the electronic certificates of a plurality of devices belonging to a device type "0x1234567" are revoked.

Figure 4:
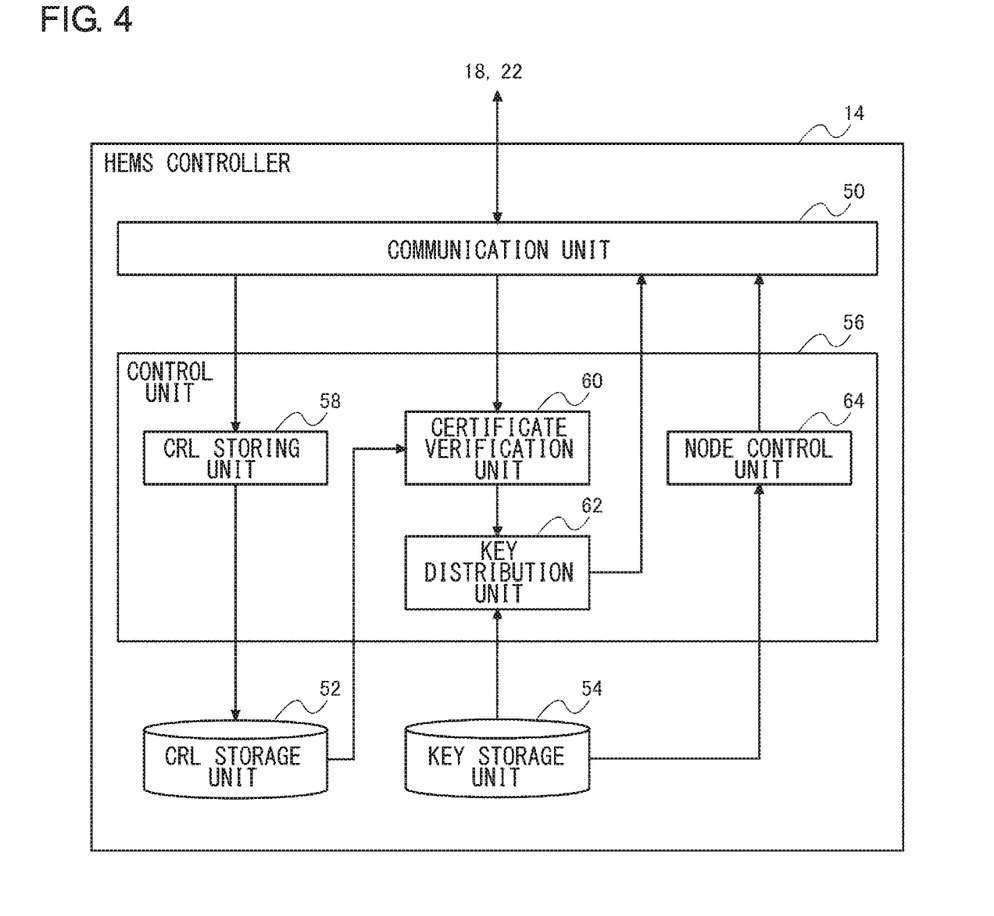
FIG. 4 is a block diagram showing functions and a configuration of the HEMS controller of FIG. 1.

FIG. 4 is a block diagram showing functions and a configuration of the HEMS controller 14 of FIG. 1. The HEMS controller 14 includes a communication unit 50, a CRL storage unit 52, a key storage unit 54, and a control unit 56.

The communication unit 50 communicates with an external device in accordance with a predetermined communication protocol. More specifically, the communication unit 50 communicates with the certificate authority server 20 via the external network 22. The communication unit 50 receives the data for the certificate revocation list transmitted from the certificate authority server 20. Further, the communication unit 50 communicates with a plurality of participation nodes 16 via the home network 18. The communication unit 50 receives the data for the electronic certificate transmitted from each of the plurality of participation nodes 16 to communicate with.

The CRL storage unit 52 stores the data for the certificate revocation list. The key storage unit 54 stores a predefined common key (hereinafter referred to as "communication key") for encrypting or decrypting the data transmitted and received between the HEMS controller 14 and the participation node 16.

The control unit 56 performs various data processes. The control unit 56 includes a CRL storing unit 58, a certificate verification unit 60, a key distribution unit 62, and a node control unit 64. The control unit 56 may further include other publicly known functions in an HEMS controller.

A computer program including a plurality of modules corresponding to the plurality of blocks in the control unit 56 may be stored in a recording medium and installed in the storage of the HEMS controller 14 via the recording medium. Alternatively, the computer program may be installed in the storage of the HEMS controller 14 via a network. The CPU of the HEMS controller 14 may exhibit the functions of the respective blocks by reading the computer program from the storage and running the computer program.

The CRL storing unit 58 stores the data for the certificate revocation list received by the communication unit 50 in the CRL storage unit 52.

The certificate verification unit 60 verifies whether the electronic certificate of the participation node 16 received by the communication unit 50 is valid or not. More specifically, in the case the serial number in which the device identifying part 48 is set to a predetermined value (i.e., the collective revocation value) is included in the certificate revocation list received by the communication unit 50 and stored in the CRL storage unit 52, the certificate verification unit 60 detects the serial number. The certificate verification unit 60 determines that the electronic certificates of the plurality of devices that meet the device type indicated by the device type identifying part 46 in the detected serial number are invalid. In the embodiment, the electronic certificates of all devices that meet the device type are determined to be invalid.

As described above, the collective revocation value in the embodiment is an all-0 bit series. In the case the device identifying part 48 of a serial number listed in the certificate revocation list is the collective revocation value, the certificate verification unit 60 collectively determines all electronic certificates for which the value of the device type identifying part 46 matches that serial number are invalid. In the case the device identifying part 48 of a serial number listed in the certificate revocation list is the collective revocation value, the device type indicated by the device type identifying part 46 of that serial number will also be referred to as the "collective revocation device type".

In the case the value of the device type identifying part 46 of the serial number of the electronic certificate subject to verification represents the collective revocation device type, the certificate verification unit 60 determines that the electronic certificate is invalid regardless of the value of the device identifying part 48 of the serial number. It is assumed, for example, that a serial number in which the device type identifying part 46 is "0x1234567" and the device identifying part 48 is "0x0000000" is recorded in the certificate revocation list. In this case, electronic certificates having serial numbers in which the device type identifying part 46 is "0x1234567" and the device identifying part 48 is "0x0000000"-"0xFFFFFFF" are determined to be invalid.

In other words, in the case the serial number in which the device identifying part 48 is set to the collective revocation value is included in the certificate revocation list, the certificate verification unit 60 detects the serial number. In the case the value of the device type identifying part 46 of the detected serial number matches the value of the device type identifying part 46 in the serial number of the electronic certificate maintained in the participation node 16 to communicate with, the certificate verification unit 60 determines that the electronic certificate maintained by the participation node is invalid. The certificate verification unit 60 rejects communication with the participation node 16 for which the electronic certificate is determined to be invalid. In the embodiment, the certificate verification unit 60 disables encrypted communication between the participation node 16 and the HEMS controller 14 by inhibiting transmission of the communication key stored in the key storage unit 54 to the participation node 16.

In one variation, the certificate verification unit may control the communication unit 50 to prohibit access from the participation node 16 to reject communication with the participation node 16. Alternatively, the certificate verification unit 60 may control the communication unit 50 to discard the data transmitted from the participation node 16. Still alternatively, the certificate verification unit 60 may control the communication unit 50 to prohibit data transmission to the participation node 16.

In the case the serial number of the electronic certificate of the participation node 16 does not match the serial number indicated by the certificate revocation list, and the value of the device type identifying part 46 in the serial number of the electronic certificate of the participation node 16 does not match the value of the collective revocation device type, the certificate verification unit 60 determines that the electronic certificate of the participation node 16 is valid. The key distribution unit 62 transmits the communication key stored in the key storage unit 54 to the participation node 16 for which it is determined that the electronic certificate is valid via the communication unit 50. This enables encrypted communication between the participation node 16 and the HEMS controller 14.

The node control unit 64 controls the operation of the participation node 16 in accordance with a rule or an algorithm predefined in the HEMS 12. For example, the node control unit 64 controls energy consumption in the HEMS 12 by controlling the operation of the participation node 16. For example, the node control unit 64 turns on lighting or starts the operation of an air conditioner. The node control unit 64 encrypts the data transmitted to the participation node 16 with the communication key stored in the key storage unit 54. Further, the node control unit 64 decrypts the data received from the participation node 16 with the communication key stored in the key storage unit 54. As already described, the communication key is not provided to the participation node 16 for which it is determined that the electronic certificate is invalid (i.e., the illegitimate node). Therefore, the illegitimate node cannot transmit or receive encrypted data to and from the HEMS controller 14.

A description will now be given of the operation of the communication system 10 having the configuration described above.

Figure 5:
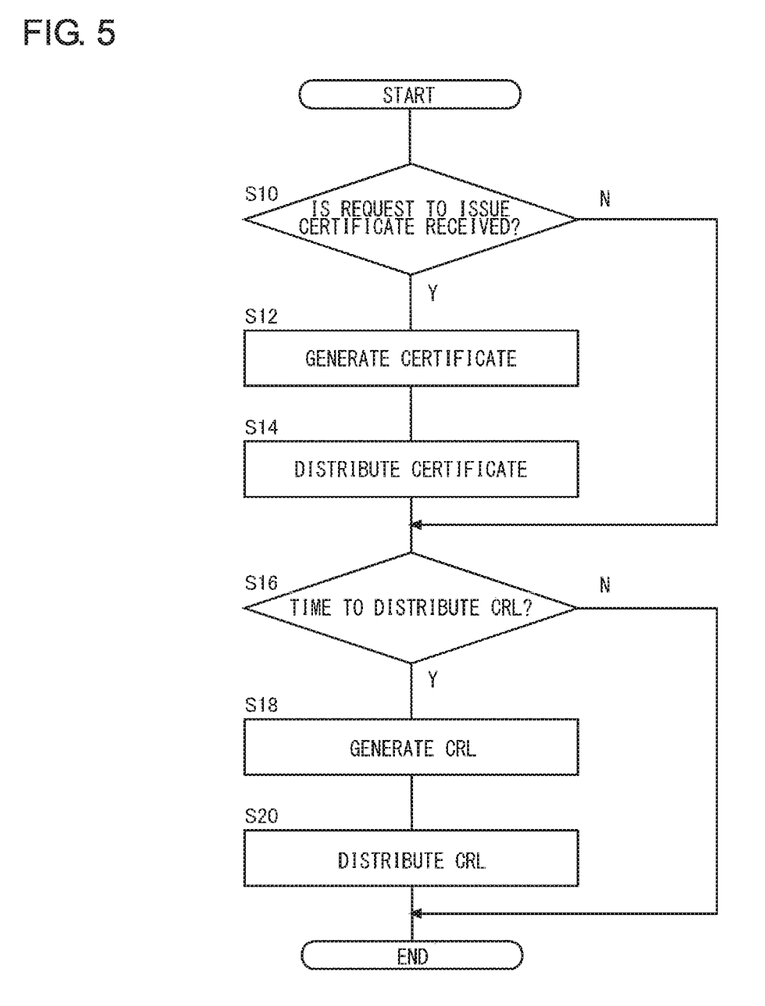
FIG. 5 is a flowchart showing the operation of the certificate authority server.

FIG. 5 is a flowchart showing the operation of the certificate authority server 20. When the communication unit receives a certificate issue request transmitted from the terminal of the manufacturer of the participation node 16 (Y in S10), the certificate generation unit 36 generates data for the electronic certificate for the participation node 16 (S12). The certificate distribution unit 38 transmits the data for the electronic certificate to the terminal of the manufacturer (S14). If the communication unit 30 has not received a certificate issue request (N in S10), the steps of S12 and S14 are skipped.

The electronic certificate provided in S14 is stored in the participation node 16 in the process of manufacturing the participation node 16. The revocation information storage unit 32 of the certificate authority server 20 stores the serial numbers of revoked electronic certificates. Further, the revocation information storage unit 32 stores information related to a device type for which the electronic certificates of a plurality of devices should be collectively revoked (i.e., the collective revocation device type).

When it is time to issue a certificate revocation list arrives as scheduled (Y in S16), the CRL generation unit 40 generates data for the certificate revocation list showing the serial numbers of the revoked electronic certificates stored in the revocation information storage unit 32 (S18). Further, the CRL generation unit 40 sets, in the certificate revocation list, the serial number for collectively invaliding the electronic certificate of the plurality of devices belonging to the collective revocation device type stored in the revocation information storage unit 32. For example, the serial number is such that the device type identifying part 46 is a value indicating the collective revocation device type and the device identifying part 48 is an all-0 value.

The CRL distribution unit 42 transmits the data for the certificate revocation list to each HEMS controller 14 of the plurality of HEMS 12 (S20). If it is not the time to issue a certificate revocation list (N in S16), the steps of S18 and S20 are skipped.

Figure 6:
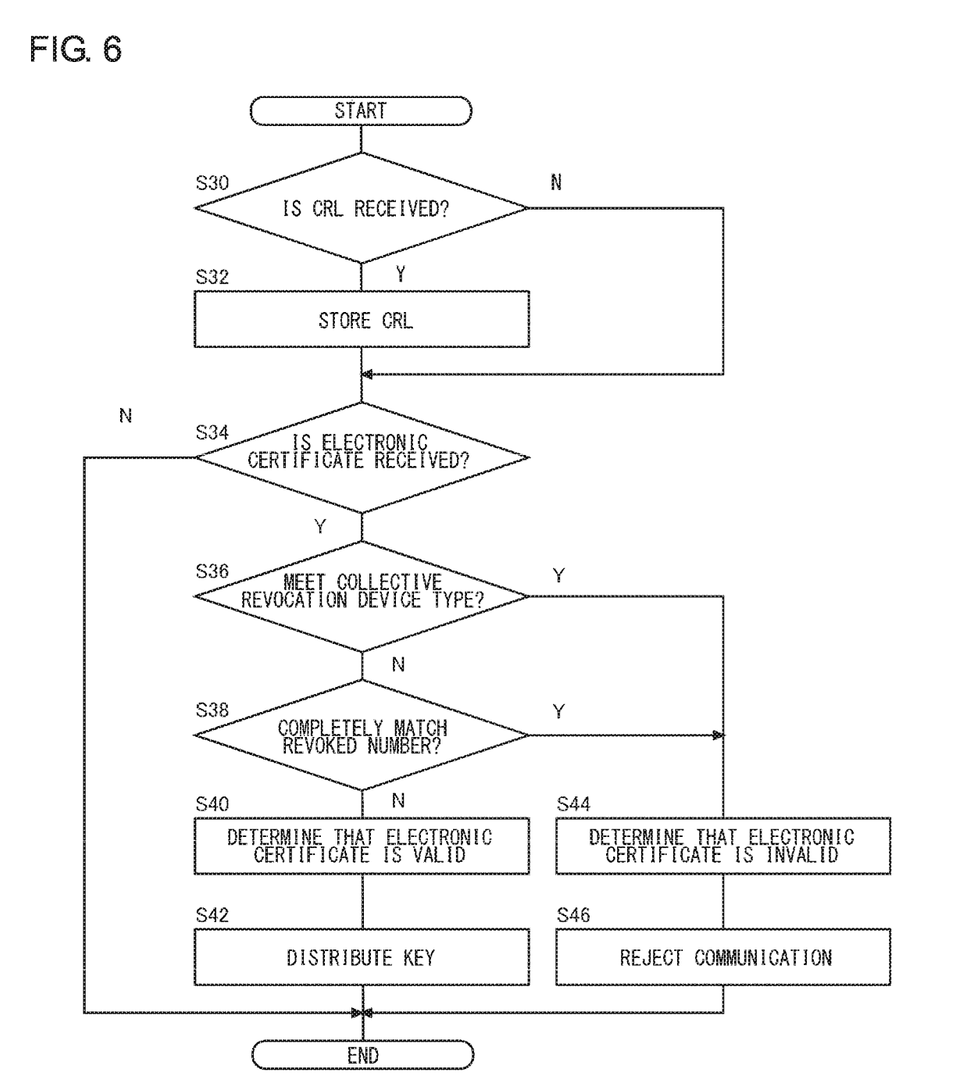
FIG. 6 is a flowchart showing the operation of the HEMS controller.

FIG. 6 is a flowchart showing the operation of the HEMS controller 14. When the communication unit 50 receives the data for the certificate revocation list transmitted from the certificate authority server 20 (Y in S30), the CRL storing unit 58 stores the data for the certificate revocation list in the CRL storage unit 52 (S32). If the communication unit 50 has not received the data for the certificate revocation list (N in S30), the step of S32 is skipped.

When the communication unit 50 receives the electronic certificate subject to verification transmitted from the participation node 16 (Y in S34), the certificate verification unit 60 verifies the validity of that electronic certificate. More specifically, the certificate verification unit 60 determines whether the value of the device type identifying part 46 of the serial number included in the electronic certificate subject to verification matches the value of the device type identifying part 46 of the serial number, among the serial numbers listed in the certificate revocation list, in which the device identifying part 48 is set to the collective revocation value (e.g., all 0s) (i.e., the collective revocation device type). Further, the certificate verification unit 60 determines whether the serial number included in the electronic certificate subject to verification matches the serial number listed in the certificate revocation list (in this case, referred to as "revoked number").

When the value of the device type identifying part 46 of the serial number included in the electronic certificate subject to verification does not match the collective revocation device type (N in S36) and, further, the serial number included in the electronic certificate subject to verification does not match a revoked number (N in S38), the certificate verification unit 60 determines that the electronic certificate subject to verification is valid (S40). The key distribution unit 62 transmits the communication key to the participation node 16 for which it is determined that the electronic certificate is valid (S42).

When the value of the device type identifying part 46 of the serial number included in the electronic certificate subject to verification matches the collective revocation device type (Y in S36) or when the serial number included in the electronic certificate subject to verification matches a revoked number (Y in S38), the certificate verification unit 60 determines that the electronic certificate subject to verification is invalid (S44). The certificate verification unit 60 and the key distribution unit 62 reject communication with the participation node 16 by inhibiting transmission of the communication key to the participation node 16 for which it is determined that the electronic certificate is invalid (S46). If the electronic certificate of the participation node 16 has not been received (N in S34), S36 and the subsequent steps are skipped, and the flow in the figure is terminated.

By operating in coordination with each other, the certificate authority server 20 and the HEMS controller 14 of the first embodiment can revoke the electronic certificates of a plurality of devices (e.g., the participation nodes 16) belonging to a particular device type collectively by using a single serial number in the certificate revocation list. This can inhibit an increase in the data size of the certificate revocation list even when the number of communication devices for which the electronic certificate is revoked increases.

Described above is an explanation based on the first embodiment. The first embodiment is intended to be illustrative only and it will be understood by those skilled in the art that various modifications to constituting elements and processes could be developed and that such modifications are also within the scope of the present invention.

The technologies according to the first embodiment and variations may be defined by the following items.

[Item 1-1]

A communication device (14) including: a communication unit (50) that receives a certificate revocation list distributed from a certificate authority and listing serial numbers of revoked electronic certificates; and a control unit (56), wherein the serial number of the electronic certificate includes a first identifying part that indicates a value for identifying a type of a device maintaining the electronic certificate and a second identifying part that indicates a value for identifying the device maintaining the electronic certificate, and in the case the certificate revocation list received by the communication unit (50) includes a serial number in which the second identifying part is a predetermined value, the control unit (56) determines that the electronic certificate of a device (16) that meets the type indicated by the first identifying part of the serial number is invalid.

According to this communication device, it is possible to determine the electronic certificates of a plurality of devices belonging a particular device type as being invalid collectively, by using a single serial number in the certificate revocation list. Accordingly, the data size of the certificate revocation list is inhibited from increasing even when the number of devices for which the electronic certificates are revoked increases.

[Item 1-2]

The communication device (14) according to Item 1-1, wherein the communication unit (50) receives, from a partner device (16) in communication, the electronic certificate maintained by the partner device, and in the case the certificate revocation list includes a serial number in which the second identifying part is the predetermined value, and the value of the first identifying part of the serial number matches the value of the first identifying part of the serial number in the electronic certificate maintained by the partner device (16), the control unit (56) rejects communication with the partner device (169.

According to this communication device, it is possible to reject communication with a plurality of devices belonging to a particular device type collectively, by using a single serial number in the certificate revocation list. Accordingly, the data size of the certificate revocation list is inhibited from increasing even when the number of devices for which the electronic certificates are revoked increases, while at the same time the safety of communication is enhanced.

[Item 1-3]

A certificate authority device (20) including an issuing unit (40) that issues a certificate revocation list listing listing serial numbers of revoked electronic certificates, wherein the serial number of the electronic certificate includes a first identifying part that indicates a value for identifying a type of a device (16) maintaining the electronic certificate and a second identifying part that indicates a value for identifying the device (16) maintaining the electronic certificate, and by setting a serial number including the first identifying part of a value indicating a particular type and the second identifying part of a predetermined value in the electronic certificate revocation list, the issuing unit (40) revokes the electronic certificate of a device (16) that meets the particular type.

According to this certificate authority device, it is possible to revoke the electronic certificates of a plurality of devices belonging a particular device type, by using a single serial number in the certificate revocation list. Accordingly, the data size of the certificate revocation list is inhibited from increasing even when the number of devices for which the electronic certificates are revoked increases.

[Item 1-4]

A computer program executed by a communication device (14) that receives a certificate revocation list distributed from a certificate authority and listing serial numbers of revoked electronic certificates, wherein the serial number of the electronic certificate includes a first identifying part that indicates a value for identifying a type of a device maintaining the electronic certificate and a second identifying part that indicates a value for identifying the device maintaining the electronic certificate, and in the case the certificate revocation list received includes a serial number in which the second identifying part is a predetermined value, the computer program causes the communication device (14) to determine that the electronic certificate of a device (16) that meets the type indicated by the first identifying part of the serial number is invalid.

According to this computer program, it is possible to determine the electronic certificates of a plurality of devices belonging a particular device type as being invalid collectively, by using a single serial number in the certificate revocation list. Accordingly, the data size of the certificate revocation list is inhibited from increasing even when the number of devices for which the electronic certificates are revoked increases.

Second Embodiment

In the second embodiment, the technology of collectively revoking the electronic certificates of a plurality of devices manufactured by the same manufacturer, based on the designation of a single serial number. The constituting elements of the HEMS 12 in the second embodiment, the constituting elements of the HEMS controller 14, and the constituting elements of the certificate authority server 20 are the same as those of the first embodiment (FIG. 1, FIG. 2, FIG. 4). The details already described in the first embodiment are omitted as appropriate, and the difference from the first embodiment will be mainly explained.

Figure 7A:
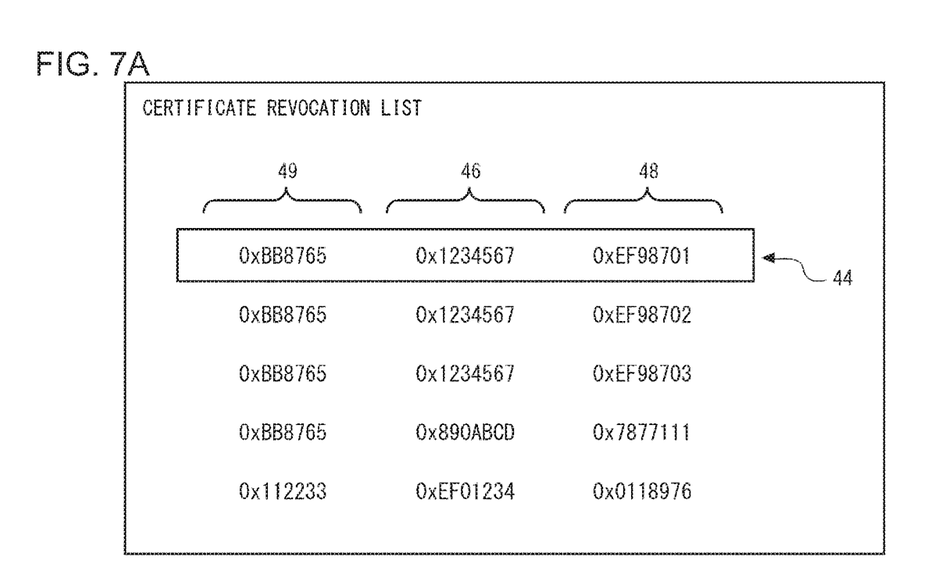
FIGS. 7A and 7B show examples of the certificate revocation list of the second embodiment.

FIG. 7A shows an example of the certificate revocation list of the second embodiment. The serial number 44 of the electronic certificate according to the second embodiment includes a manufacturer identifying part 49 in addition to the device type identifying part 46 and the device identifying part 48 described in the first embodiment. The manufacturer identifying part 49 is a field in which a value for identifying the manufacturer (enterprise, etc.) manufacturing the participation node 16. In other words, a unique value is set in the manufacturer identifying part 49 for each manufacturer.

The revocation information storage unit 32 of the certificate authority server 20 stores information for collectively revoking the electronic certificates maintained by a plurality of devices covering a plurality of device types. More specifically, the revocation information storage unit 32 stores a value indicating a particular manufacturer (hereinafter, also referred to as a "collective revocation manufacturer") manufacturing the plurality of devices covering the plurality of device types.

The CRL generation unit 40 of the certificate authority server 20 generates a serial number including the device type identifying part 46 of a first predetermined value, the device identifying part 48 of a second predetermined value, and the manufacturer identifying part 49 of a value indicating the collective revocation manufacturer stored in the revocation information storage unit 32 and sets the serial number in the certificate revocation list. In this way, the certificate authority server 20 revokes the electronic certificates of the plurality of devices manufactured by the particular manufacturer. In the embodiment, the electronic certificates of all devices manufactured by the particular manufacturer are revoked.

The first predetermined value and the second predetermined value in the second embodiment are both an all-0 bit series. In one variation, the first predetermined value and the second predetermined value may be a value other than an all-0 bit series or may be mutually different values. However, it is preferred that the first predetermined value be a value that is not set in the device type identifying part 46 in an ordinary serial number. It is also preferred that the second predetermined value be a value that is not set in the device identifying part 48 in an ordinary serial number.

Figure 7B:
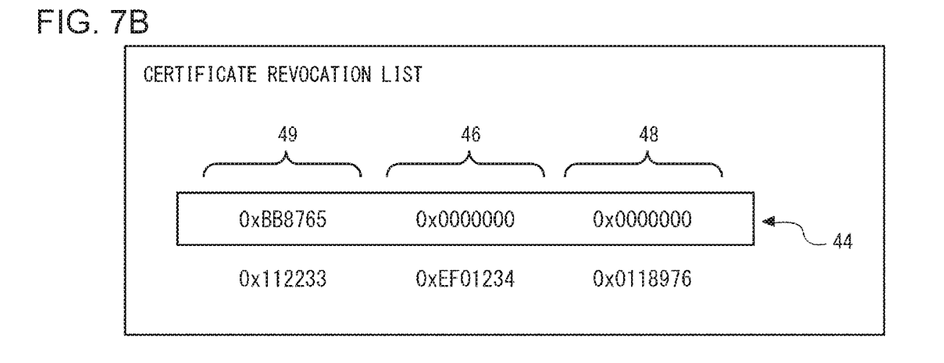

The CRL generation unit 40 sets the value stored in the revocation information storage unit 32 and indicating the collective revocation manufacturer in the manufacturer identifying part 49, generates a serial number in which both the device type identifying part 46 and the device identifying part 48 are set to all-0 bit series, and sets the serial number in the certificate revocation list. FIG. 7B also shows an example of the certificate revocation list of the second embodiment. The serial number 44 in the figure shows that the electronic certificates of a plurality of devices covering a plurality of device types manufactured by a manufacturer "0xBB8765" are revoked.

In the case the certificate revocation list received by the communication unit 50 includes a serial number in which the device type identifying part 46 is the first predetermined value and the device identifying part 48 is the second predetermined value, the certificate verification unit 60 of the HEMS controller 14 detects that serial number. The certificate verification unit 60 determines that the electronic certificates of the plurality of devices manufactured by the manufacturer indicated by the manufacturer identifying part 49 of the detected serial number (i.e., the collective revocation manufacturer) are invalid. In the embodiment, it is determined that the electronic certificates of all devices manufactured by the collective revocation manufacturer are invalid.

In the case a serial number in which the device type identifying part 46 is the first predetermined value and the device identifying part 48 is the second predetermined value is included in the certificate revocation list, the certificate verification unit 60 detects the serial number. In the case the value of the manufacturer identifying part 49 of the detected serial number matches the value of the manufacturer identifying part 49 of the serial number in the electronic certificate subject to verification received by the communication unit 50, the certificate verification unit 60 determines that the electronic certificate subject to verification is invalid. As in the first embodiment, the certificate verification unit 60 rejects communication with the participation node 16 for which it is determined that the electronic certificate is determined to be invalid.

More specifically, in the case that the device type identifying part 46 of the serial number listed in the certificate revocation list is the first predetermined value and the device identifying part 48 is the second predetermined value, the certificate verification unit 60 identifies the manufacturer indicated by the manufacturer identifying part 49 of the serial number to be a "collective revocation manufacturer". In the case the value of the manufacturer identifying part 49 of the serial number in the electronic certificate subject to verification is a value indicating the collective revocation manufacturer, the certificate verification unit 60 determines that the electronic certificate is invalid regardless of the values of the device type identifying part 46 and the device identifying part 48 of the serial number.

The certificate verification unit 60 determines that the electronic certificate of the participation node 16 is valid when the condition described in the first embodiment is met and, in addition, when the value of the manufacturer identifying part 49 in the serial number of the electronic certificate of the participation node 16 does not match the value of the collective revocation manufacturer.

A description will be given of the operation of the communication system 10 having the configuration described above. The operation of the certificate authority server 20 is as shown in FIG. 5. A difference is that the step S18 includes a step whereby the CRL generation unit 40 generates a serial number indicating the collective revocation manufacturer stored in the revocation information storage unit 32 and sets the serial number in the certificate revocation list. For example, the CRL generation unit 40 generates, as a serial number indicating the collective revocation manufacturer, a serial number in which the value indicating the collective revocation manufacturer is set in the manufacturer identifying part 49, and all-0 bit series are set in the device type identifying part 46 and the device identifying part 48.

Figure 8:
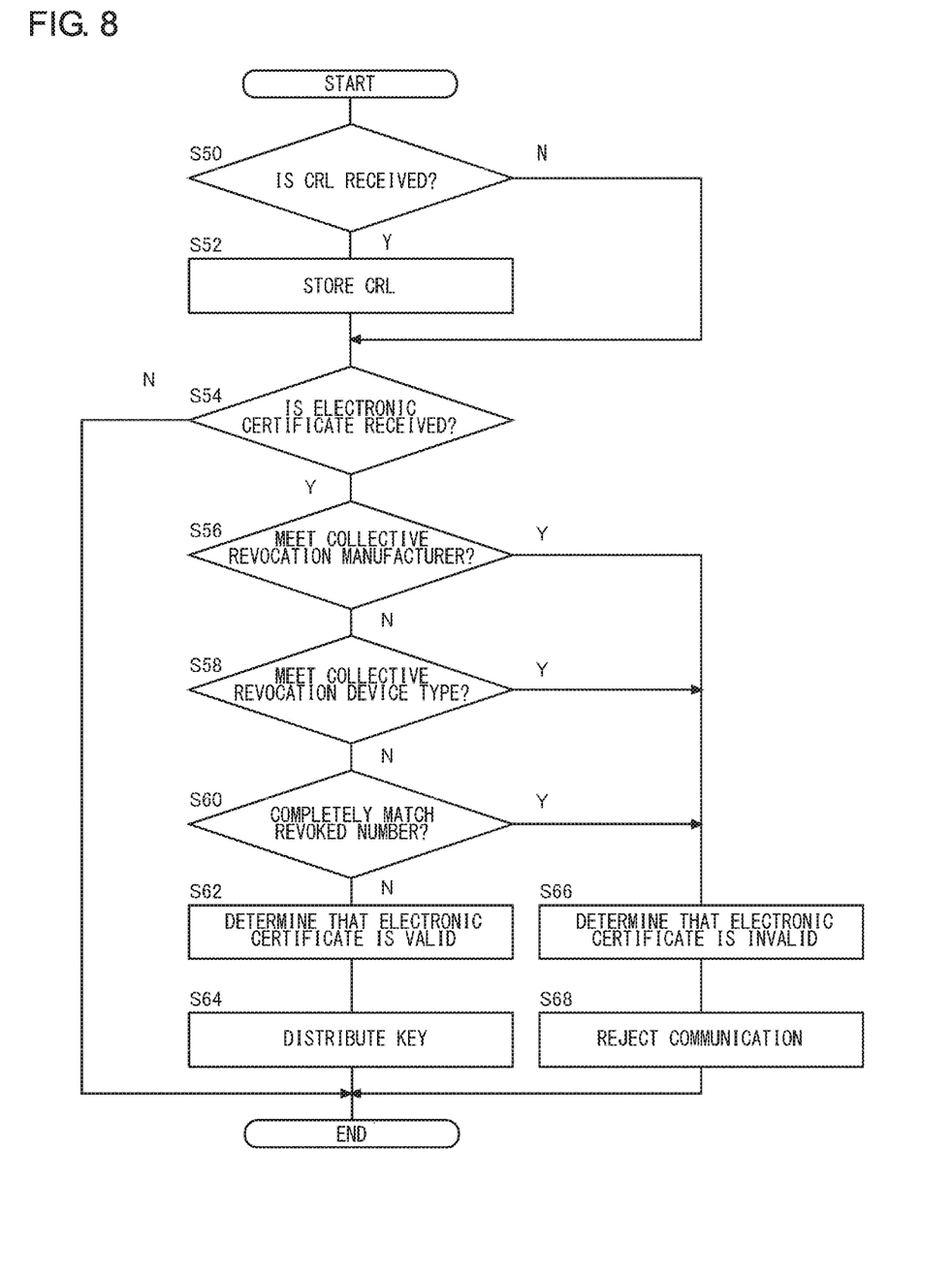
FIG. 8 is a flowchart showing the operation of the HEMS controller.

FIG. 8 is a flowchart showing the operation of the HEMS controller 14. S50 and S52 in the figure are the same as S30 and S32 in FIG. 6 so that a description thereof is omitted.

When the communication unit 50 receives an electronic certificate subject to verification transmitted from the participation node 16 (Y in S54), the certificate verification unit 60 verifies the validity of the electronic certificate. More specifically, the certificate verification unit 60 determines whether the value of the manufacturer identifying part 49 of the serial number included in the electronic certificate subject to verification matches the value of the manufacturer identifying part 49 of any of the serial numbers listed in the certificate revocation list in which the device type identifying part 46 and the device identifying part 48 are set to all 0s (i.e., the collective revocation manufacturer).

Further, the certificate verification unit 60 determines whether values of the manufacturer identifying part and the device identifying part 48 of the serial number included in the electronic certificate subject to verification match the values of the manufacturer identifying part 49 and the device type identifying part 46 of any of the serial numbers listed in the certificate revocation list in which the device identifying part 48 is set to all 0s (i.e., the collective revocation device type). Still further, the certificate verification unit 60 determines whether the serial number included in the electronic certificate subject to verification completely matches a serial number listed in the certificate revocation list (in this case, referred to as "revoked number").

In the case the value of the manufacturer identifying part 49 of the serial number included in the electronic certificate subject to verification does not match the collective revocation manufacturer (N in S56), and the values of the manufacturer identifying part 49 and the device type identifying part 46 of the serial number included in the electronic certificate subject to verification do not match the collective revocation device type (N in S58), and the serial number included in the electronic certificate subject to verification does not match a revoked number (N in S60), the certificate verification unit 60 determines that the electronic certificate subject to verification is valid (S62). The key distribution unit 62 transmits the communication key to the participation node 16 for which it is determined that the electronic certificate is valid (S64).

In the case the value of the manufacturer identifying part 49 of the serial number included in the electronic certificate subject to verification matches the collective revocation manufacturer (Y in S56), or the values of the manufacturer identifying part 49 and the device type identifying part 46 of the serial number included in the electronic certificate subject to verification match the collective revocation device type (Y in S58), or the serial number included in the electronic certificate subject to verification matches a revoked number (Y in S60), the certificate verification unit 60 determines that the electronic certificate subject to verification is invalid (S66). The certificate verification unit 60 and the key distribution unit reject communication with the participation node 16 by inhibiting transmission of the communication key to the participation node 16 for which it is determined that the electronic certificate is invalid (S68). If the electronic certificate of the participation node 16 has not been received (N in S54), S56 and the subsequent steps are skipped, and the flow in the figure is terminated.

By operating in coordination with each other, the certificate authority server 20 and the HEMS controller 14 of the second embodiment can revoke the electronic certificates of a plurality of devices covering a plurality of device types manufactured by a particular manufacturer collectively by using a single serial number in the certificate revocation list. This can inhibit an increase in the data size of the certificate revocation list even when a large number of devices covering a large number of device types manufactured by a particular manufacturer are identified as illegitimate devices and communication therewith should be rejected.

Described above is an explanation based on the second embodiment. The second embodiment is intended to be illustrative only and it will be understood by those skilled in the art that various modifications to constituting elements and processes could be developed and that such modifications are also within the scope of the present invention.

A variation to the second embodiment will be described. The serial number of the electronic certificate in the second embodiment is described as including the manufacturer identifying part 49, the device type identifying part 46, and device identifying part 48. In one variation, the serial number in the electronic certificate may include the manufacturer identifying part 49 and the device identifying part 48 but may not include the device type identifying part 46. The certificate verification unit 60 of the HEMS controller 14 according to the variation may handle the manufacturer identifying part 49 of the serial number of the electronic certificate in the same manner as the device type identifying part 46 of the first embodiment.

For example, in the case the certificate revocation list includes a serial number in which the device identifying part 48 is a predetermined value (e.g., an all-0 collective revocation value), the certificate verification unit 60 may determine that the electronic certificates of all participation nodes 16 manufactured by the manufacturer indicated by the manufacturer identifying part 49 of that serial number are invalid. Alternatively, in the case a serial number in which the device identifying part 48 is the above predetermined value is included in the certificate revocation list, and the value of the manufacturer identifying part 49 of the serial number matches the value of the manufacturer identifying part 49 of the serial number in the electronic certificate maintained by the participation node 16, the certificate verification unit 60 may reject communication with that participation node 16.

A variation applicable to both the first embodiment and the second embodiment will be described. In the first embodiment and the second embodiment, the HEMS controller 14 is illustrated as a device for verifying the electronic certificate maintained by another device. The technology described in the first embodiment and the second embodiment is widely applicable to devices for verifying the electronic certificate maintained by another device as well as to the HEMS controller 14.

The technologies according to the second embodiment and variations may be defined by the following items.

[Item 2-1]

The communication device (14) according to Item 1-1, wherein the serial number of the electronic certificate further includes a third identifying part that indicates a value for identifying a manufacturer of the device (16) maintaining the electronic certificate, and in the case the certificate revocation list received by the communication unit (50) includes a serial number in which the first identifying part is a first predetermined value and the second identifying part is a second predetermined value, the control unit (56) determines that the electronic certificate of the device (16) manufactured by the manufacturer indicated by the third identifying part of the serial number is invalid.

According to this communication device, it is possible, as in the case of Item 1-1, to determine the electronic certificates of a plurality of devices as being invalid collectively in units of device types, by using a single serial number designated in the certificate revocation list. In addition, it is possible to determine the electronic certificates of a plurality of devices as being invalid collectively in units of manufacturers, by using a single serial number designated in the certificate revocation list. Accordingly, the data size of the certificate revocation list is inhibited from increasing even when the number of devices for which the electronic certificates are revoked increases.

[Item 2-2]

The communication device (14) according to Item 2-1, wherein the communication unit (50) receives, from a partner device (16) in communication, the electronic certificate maintained by the partner device (16), and in the case the certificate revocation list includes a serial number in which the first identifying part is the first predetermined value and the second identifying part is the second predetermined value, and the the value of the third identifying part of the serial number matches the value of the third identifying part of the serial number in the electronic certificate maintained by the partner device (16), the control unit (56) rejects communication with the partner device (16).

According to this communication device, it is possible to reject communication with a plurality of devices manufactured by a particular manufacturer, by using a single serial number designated in the certificate revocation list. Accordingly, the data size of the certificate revocation list is inhibited from increasing even when the number of devices for which the electronic certificates are revoked increases, while at the same time the safety of communication is enhanced.

[Item 2-3] The certificate authority device (20) according to Item 1-3, wherein the serial number of the electronic certificate further includes a third identifying part that indicates a value for identifying a manufacturer of the device (16) maintaining the electronic certificate, and by setting a serial number including the first identifying part of a first predetermined value, the second identifying part of a second predetermined value, and the third identifying part of a value indicating a particular manufacturer in the electronic certificate revocation list, the issuing unit (40) revokes the electronic certificate of a device (16) manufactured by the particular manufacturer.

According to this certificate authority device, it is possible to revoke the electronic certificates of a plurality of devices manufactured by a particular manufacturer, by using a single serial number in the certificate revocation list. Accordingly, the data size of the certificate revocation list is inhibited from increasing even when the number of devices for which the electronic certificates are revoked increases.

[Item 2-4]

A communication device (14) including: a communication unit (50) that receives a certificate revocation list distributed from a certificate authority and listing serial numbers of revoked electronic certificates; and a control unit (56), wherein the serial number of the electronic certificate includes a first identifying part that indicates a value for identifying a manufacturer of a device (16) maintaining the electronic certificate and a second identifying part that indicates a value for identifying the device (16) maintaining the electronic certificate, and in the case the certificate revocation list received by the communication unit (50) includes a serial number in which the second identifying part is a first predetermined value, the control unit (56) determines that the electronic certificate of the device (16) manufactured by the manufacturer indicated by the first identifying part of the serial number is invalid.

According to this communication device, it is possible to determine the electronic certificates of a plurality of devices as being invalid collectively in units of manufacturers, by using a single serial number designated in the certificate revocation list. Accordingly, the data size of the certificate revocation list is inhibited from increasing even when the number of devices for which the electronic certificates are revoked increases.

[Item 2-5]

The communication device (14) according to Item 2-4, wherein the communication unit (50) receives, from a partner device (16) in communication, the electronic certificate maintained by the partner device (16), and in the case the certificate revocation list includes a serial number in which the second identifying part is the first predetermined value and the the value of the first identifying part of the serial number matches the value of the first identifying part of the serial number in the electronic certificate maintained by the partner device (16), the control unit (56) rejects communication with the partner device (16).

According to this communication device, it is possible to reject communication with a plurality of devices manufactured by a particular manufacturer collectively, by using a single serial number in the certificate revocation list. Accordingly, the data size of the certificate revocation list is inhibited from increasing even when the number of devices for which the electronic certificates are revoked increases, while at the same time the safety of communication is enhanced.

Any combination of the embodiment and a variation will also be useful as an embodiment of the present invention. A new embodiment created by a combination will provide the combined advantages of the embodiment and the variation as combined. It will be understood to a skilled person that the functions that the constituting elements recited in the claims should achieve are implemented either alone or in combination by the constituting elements shown in the embodiments and the variations.

REFERENCE SIGNS LIST

10 communication system, 14 HEMS controller, 20 certificate authority server, 40 CRL generation unit, 42 CRL distribution unit, 50 communication unit, 56 control unit, 60 certificate verification unit, 62 key distribution unit

INDUSTRIAL APPLICABILITY

The present disclosure is applicable to communication devices and certificate authority devices.

The invention claimed is:

1. A communication device comprising:
a communication unit that receives a certificate revocation list distributed from a certificate authority and listing serial numbers of revoked electronic certificates; and
a control unit, wherein
the serial number of the electronic certificate includes a first identifying part that indicates a value for identifying a type of a device maintaining the electronic certificate and a second identifying part that indicates a value for identifying the device maintaining the electronic certificate, and
in the case the certificate revocation list received by the communication unit includes a serial number in which the second identifying part is a predetermined value, the control unit determines that the electronic certificate of a device that meets the type indicated by the first identifying part of the serial number is invalid.

2. The communication device according to claim 1, wherein
the communication unit receives, from a partner device in communication, the electronic certificate maintained by the partner device, and
in the case the certificate revocation list includes a serial number in which the second identifying part is the predetermined value, and the value of the first identifying part of the serial number matches the value of the first identifying part of the serial number in the electronic certificate maintained by the partner device, the control unit rejects communication with the partner device.

3. The communication device according to claim 1, wherein
the serial number of the electronic certificate further includes a third identifying part that indicates a value for identifying a manufacturer of the device maintaining the electronic certificate, and
in the case the certificate revocation list received by the communication unit includes a serial number in which the first identifying part is a first predetermined value and the second identifying part is a second predetermined value, the control unit determines that the electronic certificate of the device manufactured by the manufacturer indicated by the third identifying part of the serial number is invalid.

4. The communication device according to claim 3, wherein
the communication unit receives, from a partner device in communication, the electronic certificate maintained by the partner device, and
in the case the certificate revocation list includes a serial number in which the first identifying part is the first predetermined value and the second identifying part is the second predetermined value, and the value of the third identifying part of the serial number matches the value of the third identifying part of the serial number in the electronic certificate maintained by the partner device, the control unit rejects communication with the partner device.

5. A certificate authority device comprising an issuing unit that issues a certificate revocation list listing serial numbers of revoked electronic certificates, wherein
the serial number of the electronic certificate includes a first identifying part that indicates a value for identifying a type of a device maintaining the electronic certificate and a second identifying part that indicates a value for identifying the device maintaining the electronic certificate, and
by setting a serial number including the first identifying part of a value indicating a particular type and the second identifying part of a predetermined value in the electronic certificate revocation list, the issuing unit revokes the electronic certificate of a device that meets the particular type.

6. The certificate authority device according to claim 5, wherein
the serial number of the electronic certificate further includes a third identifying part that indicates a value for identifying a manufacturer of the device maintaining the electronic certificate, and
by setting a serial number including the first identifying part of a first predetermined value, the second identifying part of a second predetermined value, and the third identifying part of a value indicating a particular manufacturer in the electronic certificate revocation list, the issuing unit revokes the electronic certificate of a device manufactured by the particular manufacturer.

7. A non-transitory recording medium storing a computer program, the computer program executed by a communication device that receives a certificate revocation list distributed from a certificate authority and listing serial numbers of revoked electronic certificates, wherein
the serial number of the electronic certificate includes a first identifying part that indicates a value for identifying a type of a device maintaining the electronic certificate and a second identifying part that indicates a value for identifying the device maintaining the electronic certificate, and
in the case the certificate revocation list received includes a serial number in which the second identifying part is a predetermined value, the computer program causes the communication device to determine that the electronic certificate of a device that meets the type indicated by the first identifying part of the serial number is invalid.

* * * * *